(12) United States Patent
May et al.

(10) Patent No.: US 6,582,740 B1
(45) Date of Patent: Jun. 24, 2003

(54) LAYERED CANNED PET FOOD

(75) Inventors: Stephen May, Saint Joseph, MO (US); Steven E. Dingman, Saint Joseph, MO (US); Luz Rayner, Saint Joseph, MO (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/230,622

(22) Filed: Jun. 14, 1999

Related U.S. Application Data

(60) Provisional application No. 60/023,475, filed on Aug. 6, 1996, and provisional application No. 60/036,733, filed on Jan. 24, 1997.

(51) Int. Cl.$^7$ .................................................. A23K 1/18
(52) U.S. Cl. ........................... 426/90; 426/92; 426/94; 426/106; 426/115; 426/131; 426/279; 426/282; 426/805
(58) Field of Search .............................. 426/90, 92, 94, 426/407, 106, 115, 131, 249, 112, 113, 114, 279, 282, 805

(56) References Cited

U.S. PATENT DOCUMENTS

| | | | | |
|---|---|---|---|---|
| 2,005,245 A | * | 6/1935 | Stover | ......................... 426/115 |
| 2,344,901 A | * | 3/1944 | Routh | |
| 2,768,086 A | * | 10/1956 | Bliley | ......................... 426/90 |
| 2,975,732 A | * | 3/1961 | Depasquale | |
| 3,244,537 A | * | 4/1966 | Cease | ......................... 426/114 |
| 3,681,904 A | * | 8/1972 | Rogers et al. | ................. 426/92 |
| 3,738,847 A | * | 6/1973 | Becntel | |
| 3,808,341 A | | 4/1974 | Rongey et al. | |
| 4,328,254 A | * | 5/1982 | Waldburger | .................. 426/114 |
| 4,574,174 A | * | 3/1986 | McGonigle | .................. 426/114 |
| 5,792,504 A | * | 8/1998 | Poppel et al. | ............... 426/646 |

FOREIGN PATENT DOCUMENTS

| | | | |
|---|---|---|---|
| AU | 50797196 | * | 10/1996 |
| DE | 1486634 | * | 9/1977 |
| DE | 1583351 | * | 1/1981 |
| EP | 0 121 813 | | 10/1984 |
| EP | 0 285 409 | | 10/1988 |
| EP | 675046 | * | 10/1995 |
| EP | 0 769 252 | | 4/1997 |
| GB | 1327351 | * | 8/1973 |
| JP | 59-31677 | * | 2/1984 |
| JP | 61-100174 | * | 5/1986 |
| WO | WO 93/24024 | | 12/1993 |
| WO | WO94/26606 | * | 11/1994 |
| WO | WO 97/02760 | | 1/1997 |

OTHER PUBLICATIONS

Cat Foods & Goods Guide 1992 Pet Supplies Guide, Cat Edition.
Cat Foods & Goods Guide 1994 Pet Supplies Guide, Cat Edition.

* cited by examiner

*Primary Examiner*—Steve Weinstein
(74) *Attorney, Agent, or Firm*—Bell, Boyd & Lloyd LLC

(57) ABSTRACT

A canned pet food product having a base layer and an upper layer. The base layer is formed of solid food pieces in a gravy and has a substantially conical recess formed into its upper surface. The gravy makes up about 20% to about 40% of the base layer. The upper layer is formed of a substantially solid foodstuff and fills the conical recess formed into the base layer. The substantially solid foodstuff provides about 20% to about 80% by weight of the pet food product.

8 Claims, No Drawings

LAYERED CANNED PET FOOD

This application is a 371 of PCT/EP97/03884, field Jul. 7, 1997 which claim the benefit of U.S. provisional application No. 60/023,475 filed Aug. 6, 1996 and provisional application No. 60/036,733 filed Jan. 24, 1997

FIELD OF THE INVENTION

This invention relates to a canned pet food product which contains layers of different appearance and texture. The invention also relates to a process for producing the canned pet food product.

BACKGROUND TO THE INVENTION

Canned pet foods are traditionally available in two forms; meat loafs and chunk-type products. The meat loafs are particularly well known. They are usually prepared by comminuting raw meat material and mixing it with water, salt, spices, curing agents, gelling agents and, if necessary, fats to provide a batter. The batter is then heated. The heated batter is then filled into cans to form, after retorting and cooling, a meat loaf These meat loaf products are popular because they are easily manufactured, readily digested, very palatable to animals, and are readily formulated to contain necessary nutrients and trace elements. However they are in the form of a uniform, homogeneous mass which lacks the striated and chunky appearance of meat. This may be a disadvantage for pet foods since a meat-like appearance can greatly enhance consumer acceptability.

The chunk-type products overcome this difficulty since they are formulated emulsions which simulate the appearance of meat. One example of these formulated emulsions is described in U.S. Pat. No. 4,781,939. The formulated meat emulsion described in the patent is produced by first forming a meat emulsion from a meat source. Dry ingredients such as dry proteinaceous materials (for example wheat gluten and soy flour), vitamins, minerals and the like are then mixed into the meat emulsion to provide a viscous emulsion. The viscous emulsion is then run through a high-speed emulsion mill in which the emulsion is rapidly heated to a temperature in the range of 102° C. to 118° C. The emulsion leaving the emulsion mill is fed to a holding tube where the protein in the emulsion coagulates to form a solid emulsion product. This solid emulsion product is then cut into chunks. The chunks are highly striated and resemble natural meat chunks in appearance and texture.

Another example of these formulated emulsions is disclosed in U.S. Pat. No. 5,132,137. However, in this process the viscous emulsion is heated to a temperature of 40 to 70° C. in the emulsion mill; which is much lower than that in the process disclosed in U.S. Pat. No. 4,781,939. The heated emulsion takes longer to coagulate and is therefore held in a holding tube for a longer time. The emulsion is then formed into strands and baked in an oven at a core temperature of 70 to 95° C.

Canned pet food products which are a combination of the meat loafs and the chunk-type products are also known. These products are formed of a matrix of the meat loaf surrounding pieces of formulated emulsion products.

However there is a need for canned pet food products which have new and interesting textures and appearances to further stimulate consumer interest.

SUMMARY OF THE INVENTION

Accordingly, in one aspect, this invention provides a canned pet food product comprising:

a base layer comprising solid food pieces in a gravy and having a substantially conical recess formed into its upper surface, the gravy comprising about 20% to about 40% by weight of the base layer; and an upper layer comprising a substantially solid foodstuff capable of supporting the base layer when the pet food product is inverted and filling the conical recess formed into the base layer, the substantially solid foodstuff comprising about 20% to about 80% by weight of the pet food product.

Often, after opening a can of pet food, the consumer shakes the contents out into the pet's bowl or dish. Therefore, what was the base layer becomes the upper layer in the pet's bowl or dish. The consumer is therefore presented with an attractive topping of solid food pieces in a gravy above a clearly defined layer of a substantially solid foodstuff, which includes a conical portion extending into the solid food pieces in a gravy.

The recess into the base layer may extend either partially through the base layer to be conical in shape or entirely through the base layer to be frusto-conical in shape. The upper layer may include an upper portion above and covering the upper surface of the base layer.

Preferably, the solid food pieces in the base layer are a formulated emulsion product having the striated appearance of natural meat. The formulated emulsion product preferably comprises about 65% to about 95% by weight of a meat material and about 5% to about 35% by weight of a proteinaceous material. If desired, the formulated emulsion product may be in the form of flakes.

The gravy preferably comprises water and about 2% to about 8% by weight of a starch; for example about 4% by weight of starch. The starch is preferably a heat sensitive starch such that its viscosity increasing properties are reduced after being heated. In particular, it is preferred that the gravy has an initial viscosity in the range of about 300 to about 800 centipoise prior to retorting of the can but a lower Viscosity after retorting. It is particularly preferred that the gravy have an initial viscosity of about 350 to about 450 centipoise; for example about 400 centipoise.

The base layer preferably has a moisture content of about 60% to about 70% by weight. It is particularly preferred that the base layer has a moisture content of about 63% to about 67% by weight; for example about 65% by weight.

The substantially solid foodstuff is preferably a gelled meat loaf, cooked rice, cooked noodles, or aspic, or mixtures thereof. The aspic may contain food pieces such as cooked vegetable pieces.

When the solid foodstuff is a gelled meat loaf, the upper layer preferably has a moisture content of about 70% to about 85% by weight.

During filling, the upper layer preferably has a viscosity in the range of about 1800 to about 4000 centipoise.

In another aspect, this invention provides a process for producing a canned pet food product having at least two layers, the process comprising:

filling a base layer comprising solid food pieces in a gravy into a can, the gravy having a viscosity in the range of about 300 to about 800 centipoise and forming about 20% to about 40% by weight of the base layer;

filling an upper layer into the can, the upper layer comprising a settable foodstuff having a viscosity in the range of about 1800 to about 2500 centipoise and, upon cooling, forming a substantially solid foodstuff, the settable foodstuff comprising about 20% to about 80% by weight of upper and base layers;

sealing and spinning the can for causing the base layer to flow up the sides of the can and forming a substantially conical recess into the upper surface of the base layer; and retorting the sealed can.

In a yet further aspect, this invention provides a process for producing a canned pet food product having at least two layers, the process comprising:

filling a base layer comprising solid food pieces in a gravy into a can, the gravy having a viscosity in the range of about 300 to about 800 centipoise and forming about 20% to about 40% by weight of the base layer;

spinning the can about a vertical axis for causing the base layer to flow up the sides of the can and forming a substantially conical recess into the upper surface of the base layer;

filling an upper layer into the can, the upper layer comprising a settable foodstuff having a viscosity in the range of about 2500 to about 4000 centipoise and, upon cooling, forming a substantially solid foodstuff, the settable foodstuff comprising about 20% to about 80% by weight of upper and base layers;

sealing the can; and retorting the sealed can.

Preferably the base layer is filled into the can to provide about 30% to about 50% by weight of the upper and base layers.

In a yet further aspect, this invention provides a canned pet food product having at least two layers and produced according to the process defined above.

DETAILED DESCRIPTION OF THE INVENTION

Embodiments of the invention are now described, by way of example only. To produce the pet food product, a mixture of solid food pieces in a gravy and a settable foodstuff must be separately prepared.

a) Preparation of the Solid Food Pieces in Gravy

The mixture of solid food pieces in a gravy may be prepared by simply mixing together solid pieces of meat or other material, or both, and a gravy. The meat material may be any suitable meat source, for example, muscular or skeletal meat, meat by-products or a mixture of meat and meat by-products. The meat material may be in the form of chunks or may be in the form of flakes. However, if a meat material is used, it is preferred if the solid food pieces are a formulated emulsion product. Solid pieces of other material may also be used; such as cooked rice grains, pasta or noodles, vegetable pieces, and the like.

If a formulated emulsion product, is used, it may be produced by any suitable procedure, for example the procedures described in U.S. Pat. Nos. 4,781,939 and 5,132,137. In these procedures, a meat material is formed into a meat emulsion; usually by grinding and then emulsifying blocks of the meat material. The meat material may be any suitable source of animal protein; for example the muscular or skeletal meat of mammals, poultry, and fish or meat by-products such as hearts, liver, kidneys, tongue and the like. The exact composition may be selected according to cost and the desired flavor. The meat material conveniently may be in frozen form prior to grinding. Alternatively or in addition, the meat material may be in the form of meat meals such as poultry meal, fish meal, red meat meal and mixtures thereof. Again the exact composition may be selected according to cost and the desired flavor. Mixtures of any of the above may also be used. The emulsification may be carried out in any suitable equipment.

Usually a proteinaceous material is added to the emulsion to improve emulsion stability and binding. The proteinaceous material may be a vegetable or animal protein source; for example wheat gluten, soy flour, soy protein concentrates, soy protein isolates, egg proteins, whey, casein, etc. The exact choice will depend upon availability, cost and palatability. Usually about 5% to about 35% of the proteinaceous material is used.

If desired or required, fats may be added to the emulsion. Usually the amount of fat in the emulsion must be controlled to facilitate processing and to obtain an acceptable product. However, the meat material may well contain the desired amount of fats and hence adjustment may not be necessary. Typically at this stage the emulsion contains a maximum fat level of about 25% by weight. Conveniently, the amount of fat in the emulsion is in the range of about 5% to 15% by weight; more preferably about 7% to about 12% by weight. The mass ratio protein to fat in the emulsion is preferably about 1:1 to about 7:1. If added, the fats may be any suitable animal fats; for example tallow, or may be vegetable fats.

Additional ingredients such as sugars, salts, spices, seasonings, flavoring agents, minerals, and the like may also be added to the emulsion. The amount of additional ingredients used is preferably such that they make up about 1% to about 5% by weight of the formulated emulsion product.

Water may also be added to provide from about 45% to 80% by weight moisture in the emulsion. If sufficient moisture is present in the meat material, water need not be added.

Once mixed, the emulsion is preferably fed through a vacuum stuffer, or similar de-aeration apparatus, to de-aerate the emulsion. This removes air which may otherwise cause disruption of the formulated emulsion product and reduce its meat-like appearance.

The emulsion is then fed to an emulsion mill which subjects the emulsion to rapid mechanical heating and shearing. Any suitable emulsion mill may be used, for example the emulsion mill disclosed in U.S. Pat. No. 5,132,137. Other suitable emulsion mills are commercially available under the trade name of Trigonal and may be obtained from Siefer Machinenfabrik GmbH & Co KG, Bahnhofstrasse 114, Postfach 101008, Velbert 1, Germany.

The temperature of the emulsion is raised to the desired coagulation temperature in the emulsion mill in a few seconds. For example, the temperature may be raised to from about 100° C. to about 120° C. Alternatively, the temperature may be raised to in the range of about 45° C. to about 75° C. as described in U.S. Pat. No. 5,132,137. Usually the mechanical energy generated in the emulsion mill will be sufficient to heat the emulsion but this maybe supplemented by the injection of superheated steam.

The heated emulsion leaving the emulsion mill is then transferred to a holding tube. In the holding tube, the heated emulsion coagulates while moving slowly along the holding tube. The residence time of the heated emulsion in the holding tube is sufficient for the emulsion to have coagulated into a firm emulsion product upon reaching the exit of the holding tube.

The firm emulsion product leaving the holding tube is then transferred to a cutter where it is cut into chunks of size suitable for use in a pet food. The chunks may be subjected to flaking if desired.

The gravy or sauce is produced from water, starch and suitable flavoring agents and should comprise about 20% to about 40% by weight of the mixture of solid pieces and gravy. The amount of starch used is sufficient to provide a gravy with a viscosity of about 300 to about 800 centipoise; especially about 400 centipoise. Up to about 8% by weight of starch may be used to obtain this viscosity. The starch is preferably such that its viscosity increasing properties break down during retorting of the canned pet food. These starches, which are commonly known as modified starches for filling retorted foods, are commercially available from Staley Manufacturing Company (2200 E. Eldorado Street. Decatur, Ill. 62525, USA) and National Starch and Chemical Company (10 Finderne Avenue, Bridgewater, N.J. 08807).

In place of, or in addition to, the starch, one or more suitable gums may be incorporated into the gravy. Suitable gums are kappa-carrageenan, locust bean gum, guar gum and xanthan gum.

b) Preparation of the Settable Foodstuff

When the substantially solid foodstuff is selected to be a gelled meat loaf, the settable foodstuff is a meat batter. The meat batter may be prepared by emulsifying a suitable meat material to produce a meat emulsion. The meat material may be any suitable meat source, for example as described above. Suitable gelling agents, for example gums such as kappa-carrageenan, locust bean gum, guar gum and xanthan gum may be added to the meat emulsion. Usually no more than about 2% by weight of gum is needed.

Additional ingredients such as sugars, salts, spices, seasonings, flavoring agents, minerals, and the like may also be added to the meat emulsion. The amount of additional ingredients used is preferably such that they make up about 0.25% to about 5% by weight of the meat batter.

Water may also be added the meat emulsion to provide from about 70% to about 85% by weight. If sufficient moisture is present in the meat-material, water need net be added.

The meat emulsion is then heated to a temperature above about 65° C. in a mixer-cooker. Steam may be injected into the meat batter if desired. The heated meat emulsion is then again emulsified to provide the meat batter and the meat batter maintained at a temperature above about 60° C. until needed. At this stage, depending upon the canning process, the meat batter has a viscosity in the range of about 1800 to about 4000 centipoise. These viscosities may be obtained by suitably altering the amount or composition of the gum added to the meat batter.

Alternative, the substantially solid foodstuff may be cooked rice or noodles, or both. In this case, the settable foodstuff may be freshly cooked rice or noodles. Upon cooling, the freshly cooked rice or noodles form a substantially solid layer. If desired, suitable gelling or thickening agents, for example gums such as kappa-carrageenan, locust bean gum, guar gum and xanthan gum may be added to the rice or noodles. Usually no more than about 2% by weight of gelling or thickening agent is needed.

Additional ingredients such as sugars, salts, spices, seasonings, flavoring agents, minerals, and the like may also be added to the rice or noodles. The amount of additional ingredients used is preferably such that they make up about 0.25% to about 5% by weight of the settable foodstuff.

Alternative, the substantially solid foodstuff may be an aspic; for example an aspic which contains cooked vegetable pieces. The aspic may be prepared as is conventional. Additional ingredients such as sugars, salts, spices, seasonings, flavoring agents, minerals, and the like may also be added to aspic. The amount of additional ingredients used is preferably such that they make up about 0.25% to about 5% by weight of the aspic.

c) Canning

The mixture of the solid food pieces and gravy and the settable foodstuff are then fed to suitable filling machines; one for filling the solid food pieces and gravy and one for filling the settable foodstuff. For filling the solid food pieces and gravy, a pocket filling is particularly suitable. Pocket fillers are commercially available; for example from Luthi Machinery and Engineering Co., Inc (1726 W. 180th Street, Gardena Calif., 90248, USA), Carruthers Equipment Company (1815 N. W. Warrenton Drive, Warrenton, Oreg. 97146, USA) and Zilli & Bellini SPA (Via Benedetta, 85/A, 43100 Parma, Italy). Suitable filling machines for filling the settable foodstuff are commercially available from Hema USA Inc (426 W. Universal Circle, Sandy, Utah 84070, USA), PRC (2582 S. Tejon Street, Englewood, Colo. 80110, USA). During filling, the settable foodstuff should be maintained at a temperature or conditions to prevent gelling or setting.

A metered amount of the mixture of the solid food pieces and gravy is fed into each can entering the pocket filler in a defined layer comprising about 20% to about 80% of the volume or weight of the product. For example, the layer may make up about 30% to about 70% of the volume or weight of the product.

At this point the can may be spun about a vertical axis to cause the mixture of the solid food pieces and gravy to flow up the sides of the can and leave a substantially conical recess into its upper surface. If this is done, the mixture should have a viscosity in the range of about 2500 to about 4000 centipoise. Alternatively, the can may be fed directly to a separate filling machine. If this is done, the mixture should have a viscosity in the range of about 1800 to about 2500.

Once the cans reach the separate filling machine, a metered amount of the settable foodstuff is then fed onto the mixture of the solid food pieces and gravy. The can is then sealed. If the can was not spun prior to filling of the settable foodstuff, it is spun at this point. This spinning causes the mixture of the solid food pieces and gravy to flow up the sides of the can and leave a substantially conical recess into its upper surface. The settable foodstuff fills the conical recess as it is formed. Due to the density and viscosity of the mixture of the solid food pieces and gravy and the density and viscosity of the settable foodstuff, clear and distinct layers are formed in the can despite the spinning. These layers remain clear and distinct during seaming of the cans. After it has cooled, the settable foodstuff will form a firm, substantially solid foodstuff.

The cans are then retorted under conditions sufficient to effect commercial sterilization in the normal manner. Typically the cans are retorted at a temperature of about 115° C. to about 125° C. for about 30 to 100 minutes. During the retorting operation, the starch in the gravy preferably breaks down such that the previously viscous gravy takes on the appearance of a thin, runny sauce.

The extent and size of the recess may be readily adjusted by adjusting the rotational speed of the cans during spinning and the length of time that they are spun. If spun sufficiently fast and long enough, especially if spun prior to filling of the settable foodstuff, the recess may extend entirely through the base layer to take on a frusto-conical shape.

The cans produced by the process contain a product which comprises a lower layer made up of solid pieces of food in a thin sauce and having a substantially conical recess; and an upper layer of a substantially solid foodstuff. The layers are clear and distinct and the product is visually attractive once removed from the can.

EXAMPLE 1 a) Production of Solid Food Pieces in Gravy

Blocks of frozen meat made up of beef, pork, poultry, fish and meat byproducts are cut into pieces of about 10 cm in size and the pieces are then ground in a meat grinder. The ground meat is transferred to a mixer in which it is heated to a temperature of about 0° C. After mixing, the ground meat is fed into an emulsifier in which it is emulsified and heated to a temperature of about 20° C. The meat emulsion is then transferred to a mixer. A blend of dry proteinaceous material made up of a mixture of wheat gluten, soy flour and soy protein concentrate is added. Additives in the form of vitamins, minerals, flavoring agents, sugars and salts are then added. At this stage, the emulsion is made up of about 77% by weight of meat materials, about 21% by weight of the proteinaceous material and about 2% additives. The fat content is about 10% by weight and the moisture content is about 55% by weight.

The emulsion, at a temperature of about 35° C., is then pumped to an emulsion mill in which it is rapidly heated up to a temperature of about 107° C. The hot emulsion is ejected from the emulsion mill into a holding tube. The emulsion moves slowly through the holding tube such that it is sufficiently cooled and coagulated upon exiting the tube. The coagulated product leaving the holding tube is then cut into cubes of about 2 cm dimension. The chunks have a highly striated, meat like appearance. The chunks are then cooled and flaked to produce flakes of about 1 to about 2 cm size. The flakes are screened to remove small fragments.

A gravy is then prepared by mixing a modified starch, flavoring and coloring agents, and water. The gravy has a viscosity of about 400 centipoise. The mixture is heated to about 80° C. and then blended with the flakes. The gravy provides about 34% by weight of the mixture of solid food pieces and gravy. The moisture content is about 65% by weight.

b) Production of Meat Batter

Blocks of frozen meat made up of beef, pork, poultry, fish and meat byproducts are cut into pieces of about 10 cm in size and the pieces are then ground in a meat grinder. The ground meat is transferred to a mixer and heated. Vitamins, minerals, flavoring agents, salts and about 1% by weight of a gum mixture are added. The mixture is heated to about 75° C. under mixing and maintained at this temperature. The meat batter has a viscosity of about 3000 centipoise.

c) Canning

The mixture of solid food pieces in gravy is transferred to a pocket filler obtained from Carruthers Equipment Company and filled into cans. The amount of the mixture of solid food pieces in gravy is selected to provide about 40% of the total product weight in the can. The cans are spun to cause the mixture to flow up the sides of the cans to just below the tops of the cans. The recess formed in the center of the mixture extends clear through to the base of the can.

The cans are then transferred to a filling machine obtained from PRC. The remaining space in each can is filled with meat emulsion. During transfer to the filling machine, the mixture of solid food pieces and gravy retains it shape.

The cans are then seamed and retorted. A can is opened and turned out onto a plate. The product has a clearly defined lower layer made up of meat loaf topped by a layer of meat flakes in a thin sauce. The lower layer is frusto-conical in shape and projects to the upper surface of the upper layer.

EXAMPLE 2

A mixture of solid food pieces and gravy is produced as described in example 1. A meat batter is also produced as described in example 1 except that the meat batter has a viscosity of about 2000 centipoise.

The mixture of solid food pieces in gravy is transferred to a pocket filler obtained from Carruthers Equipment Company and filled into cans. The amount of the mixture of solid food pieces in gravy is selected to provide about 40% of the total product weight in the can.

The cans are then transferred to a filling machine obtained from PRC. The remaining space in each can is filled with meat emulsion.

The cans are then seamed and spun to cause the mixture of solid food pieces and gravy to flow up the sides of the cans and form a recess in the center of the mixture. The cans are then retorted. A can is opened and turned out onto a plate. The product has a clearly defined lower layer made up of meat loaf topped by a layer of meat flakes in a thin sauce. The lower layer includes a conical projection which extends into the upper layer.

EXAMPLE 3

The process of example 1 is repeated except that cooked rice is substituted for the flakes of formulated meat emulsion in the solid food pieces and gravy. A can of the product is opened and turned out onto a plate. The product has a clearly defined lower layer made up of meat loaf topped by a layer of rice in a thin sauce. The lower layer is frusto-conical in shape and projects to the upper surface of the upper layer.

EXAMPLE 4

The process of example 1 is repeated except that freshly cooked rice is used in place of the meat batter. A can of the product is opened and turned out onto a plate. The product has a clearly defined lower layer made up of cooked rice topped by a layer of meat flakes in a thin sauce. The lower layer is frusto-conical in shape and projects to the upper surface of the upper layer.

What is claimed is:

1. A canned pet food product comprising:
   a base layer comprising solid food pieces in a gravy and having a substantially conical recess formed into its upper surface, the gravy comprising about 20% to about 40% by weight of the base layer; and
   an upper layer comprising a substantially solid foodstuff capable of supporting the base layer when the pet food product is inverted and filling the conical recess formed into the base layer, the substantially solid foodstuff comprising about 20% to about 80% by weight of the pet food product, wherein said layers are clearly defined relative to each other.

2. A product according to claim 1 in which the recess into the base layer extends entirely through the base layer to be substantially frusto-conical in shape.

3. A product according to claim 1 in which the solid food pieces in the base layer are a formulated emulsion product having the striated appearance of natural meat.

4. A product according to claim 3 in which the formulated emulsion product is in the form of flakes.

5. A product according to claim 1 in which the gravy comprises water and about 2% to about 8% by weight of a heat sensitive starch which undergoes a reduction in its viscosity increasing properties during heating.

6. A product according to claim 1 in which the base layer has a moisture content of about 60% to about 70% by weight.

7. A product according to claim 1 in which the substantially solid foodstuff is a gelled meat loaf, cooked rice, cooked noodles, or aspic, or mixtures thereof.

8. A product according to claim 1 in which the upper layer has a viscosity in the range of about 1800 to about 4000 centipoise during filling of the upper layer into the can.

* * * * *